Figure 1:
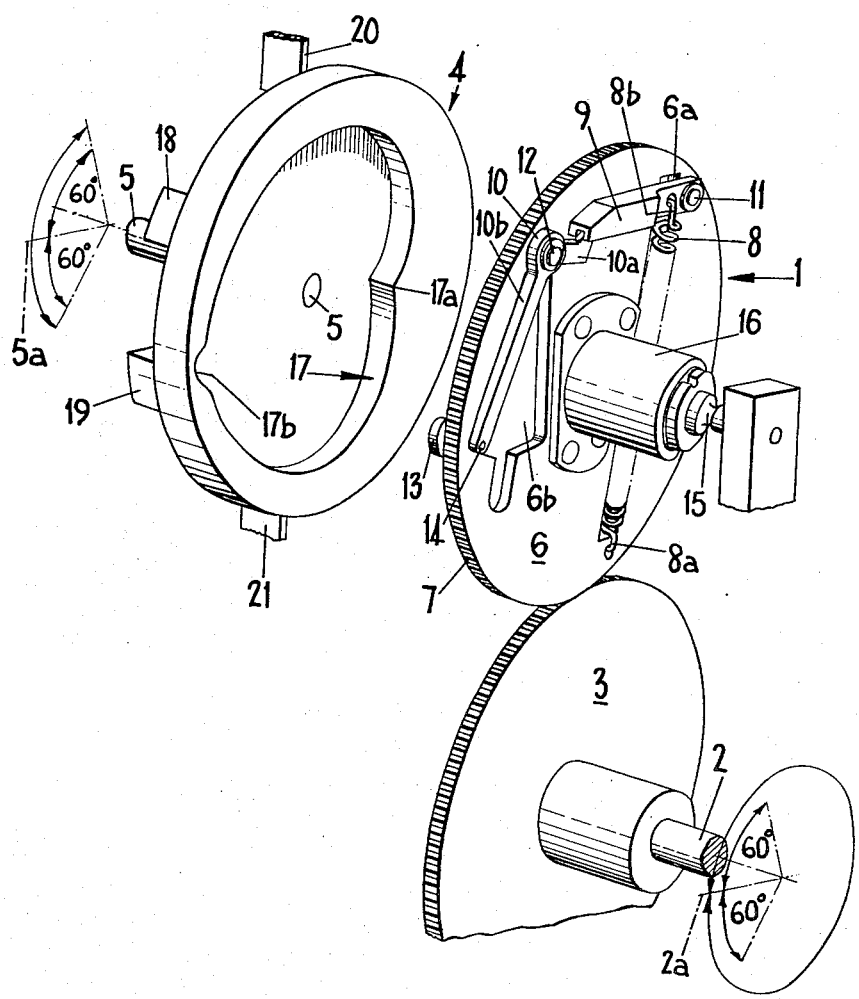

Aug. 22, 1961 L. SOUTHERN 2,996,902
SHAFT COUPLINGS

Filed Aug. 26, 1958 2 Sheets-Sheet 1

INVENTOR
LESLIE SOUTHERN
BY
ATTORNEYS

United States Patent Office 2,996,902
Patented Aug. 22, 1961

2,996,902
SHAFT COUPLINGS
Leslie Southern, Chipperfield, England, assignor to The General Electric Company Limited, London, England
Filed Aug. 26, 1958, Ser. No. 757,275
Claims priority, application Great Britain Sept. 2, 1957
3 Claims. (Cl. 64—29)

The present invention relates to shaft couplings for rotatably coupling two shafts together.

In certain control systems, such as for example synchro systems used in the control of the position of a radar aerial, it is required to maintain a predetermined angular correspondence, at least over a predetermined angular range, between the angular positions of two rotatable shafts; that is, it is required that at least within this predetermined range, there is, for any angular position of one shaft, a corresponding angular position of the other, and that rotation of one shaft results in rotation of the other to maintain this correspondence. If, in such a system, there is a constraint upon one of the shafts which limits the possible angular position of that shaft to a predetermined limited range, then it may be necessary to provide complicated and expensive equipment to ensure that for any rotation of the other shaft within the angular range corresponding to this predetermined range, the required correspondence is always maintained between the shafts irrespective of any rotation of this other shaft outside that corresponding range. It is an object of the present invention to provide relatively simple means which may be used to maintain a required predetermined angular correspondence between two such shafts.

According to the present invention a shaft coupling for rotatably coupling two shafts together includes means adapted to allow rotation of one shaft without a corresponding rotation of the other shaft only when the torque opposing rotation of said other shaft through the coupling exceeds a predetermined value, the shaft coupling being such that in operation a predetermined correspondence is maintained between the angular positions of the shafts for any rotation of those shafts for which said means does not allow rotation of said one shaft without a corresponding rotation of said other, and that this correspondence is maintained irrespective of any such rotation of said one shaft without the other.

According to a feature of the present invention a shaft coupling for rotatably coupling a driving shaft to a driven shaft, where the driven shaft is constrained to have an angular position within a predetermined finite angular range about a datum angular position of that shaft, comprises a cam adapted to be rotated with one of the shafts, and a cam follower to be rotated with the other of the shafts and to be urged into engagement with the cam, rotation of the driving shaft being transmitted to the driven shaft to rotate the driven shaft within said predetermined angular range by engagement of the cam follower with a predetermined portion of the cam so that a predetermined correspondence is thereby maintained between the angular positions of the two shafts throughout the range of angular positions of the driving shaft for which rotation of the driving shaft causes rotation of the driven shaft within said predetermined angular range, but so that, due to the constraint upon the driven shaft and the shape of the cam, reaction between the cam follower and the cam for all angular positions of the driving shaft outside said range of angular positions of that shaft acts to maintain the angular position of the driven shaft in one or other of the limiting angular positions of said predetermined angular range, and to cause the angular position of the driven shaft to change from one to the other of these limiting positions for rotation of the driving shaft through such angular positions outside said range of that driving shaft.

A shaft coupling according to the present invention will now be described, by way of example, with reference to the accompanying drawings, in which:

FIGURE 1 is a perspective view of the coupling in which two portions of the coupling, a driving member and a driven member, have been shown separated for clarity; and FIGURES 2(a) to 2(d) are diagrammatic representations of the coupling shown in FIGURE 1, to which reference is made to illustrate the operation of that coupling.

Referring to FIGURE 1, the coupling comprises a driving member 1 to which a driving shaft 2 is coupled through a gear 3, and a driven member 4 which is secured to a driven shaft 5.

The driving member 1 comprises a circular metal plate 6 having circumferential teeth 7 (represented diagrammatically) which engage with the gear 3 (also represented diagrammatically), a tension spring 8, an arm 9, and a bell crank lever 10. The spring 8 is partly located within a slot 6a in the plate 6, and is secured at one end 8a to the plate 6 and at the other end 8b to the arm 9. The arm 9 is pivoted by a pivot 11 to the plate 6, and under the action of the spring 8 bears upon an arm 10a of the bell crank lever 10. The bell crank lever 10 is pivoted to the plate 6 by a pivot 12, and the other arm 10b of this lever 10 carries a roller 13. The action of the spring 8 upon the arm 9 causes the arm 9 to bear upon the arm 10a so that the arm 10b is biased outwardly away from the center of the plate 6.

The arm 10b lies partly within a generally sector-shaped hole 6b in the plate 6, and the roller 13 is secured to the arm 10b by a pin 14 which projects from the arm 10b towards the driven member 4. The roller 13 is free to rotate about the pin 14, being in fact the outer ring of a ball race the inner ring of which is secured to the pin 14.

The driving member 1 is mounted upon a fixed shaft 15 by means of a ball race (not shown) which is housed within a boss 16 secured to the plate 6. The driving member 1 is thereby free to rotate about the shaft 15 for any rotation of the gear 3. The gear 3 is secured to the shaft 2, and the gear ratio between the gear 2 and the teeth 7 of the member 1 will be assumed to be 1:1.

The driven member 4 is constituted by a cam having an internal heart-shaped cam surface 17, this surface having a re-entrant portion 17a at the cusp of the heart shape, and an indent 17b. The re-entrant portion 17a and the indent 17b lie at the nearest and farthest points respectively, of the heart-shaped surface 17 from the axis of the driven shaft 5.

Two stops 18 and 19 are provided on the driven member 4 to co-operate in operation of the coupling with two fixed end stops 20 and 21 separate from the member 4. The stops 18 to 21 limit the possible range of rotation of the driven member 4 so that the possible range of rotation of the driven shaft 5 is thereby limited to a range of ±60 degrees about the datum angular position of the shaft 5 as represented in FIGURE 1.

In operation, the driven member 4 is positioned close to the driving member 1 with the roller 13 urged into contact with the internal cam surface 17 by the outward bias imposed upon the arm 10b under the action of the spring 8. The hole 6b is arranged to be large enough to allow sufficient freedom of movement to the arm 10b about the pivot 12, which is consistent with the roller 13 being free to follow the contour of the cam surface 17 when (as described later) there is any relative rotation between the driving member 1 and the driven member 4 in operation.

The shaft coupling described above with reference to

FIGURE 1, is for use in a synchro system (not shown) which controls the position of a radar aerial (also not shown). Movement of this radar aerial is limited and it is as a result necessary to limit the angular range through which the driven shaft 5 may be rotated, to ±60 degrees about the datum position of that shaft irrespective of any rotation of the driving shaft 2. In addition, it is necessary that the angular position of the driven shaft 5 shall be maintained in correspondence with that of the driving shaft 2 as far as this is possible with the constraint imposed upon the shaft 5 by the stops 18 to 21. The present shaft coupling satisfies these requirements so that, for any angular position of the driving shaft 2 (this angular position being indicated by a line 2a), within an angular range of ±60 degrees about the datum angular position of that shaft as shown in FIGURE 1, there is a corresponding angular position of the driven shaft 5 (this angular position being indicated by a line 5a), any rotation of the driving shaft 2 within this range being transmitted to the driven shaft 5 through the coupling to maintain this angular correspondence between the shafts. In addition, the driving shaft 2 is free to adopt any angular position outside the above angular range notwithstanding the constraint imposed upon the angular position of the driven shaft 5 by the stops 18 to 21; and the driven shaft 5 remains in angular correspondence with the driving shaft 2 over the whole of the above range of ±60 degrees irrespective of any such rotation of the driving shaft 2 outside that range.

Figure 2:
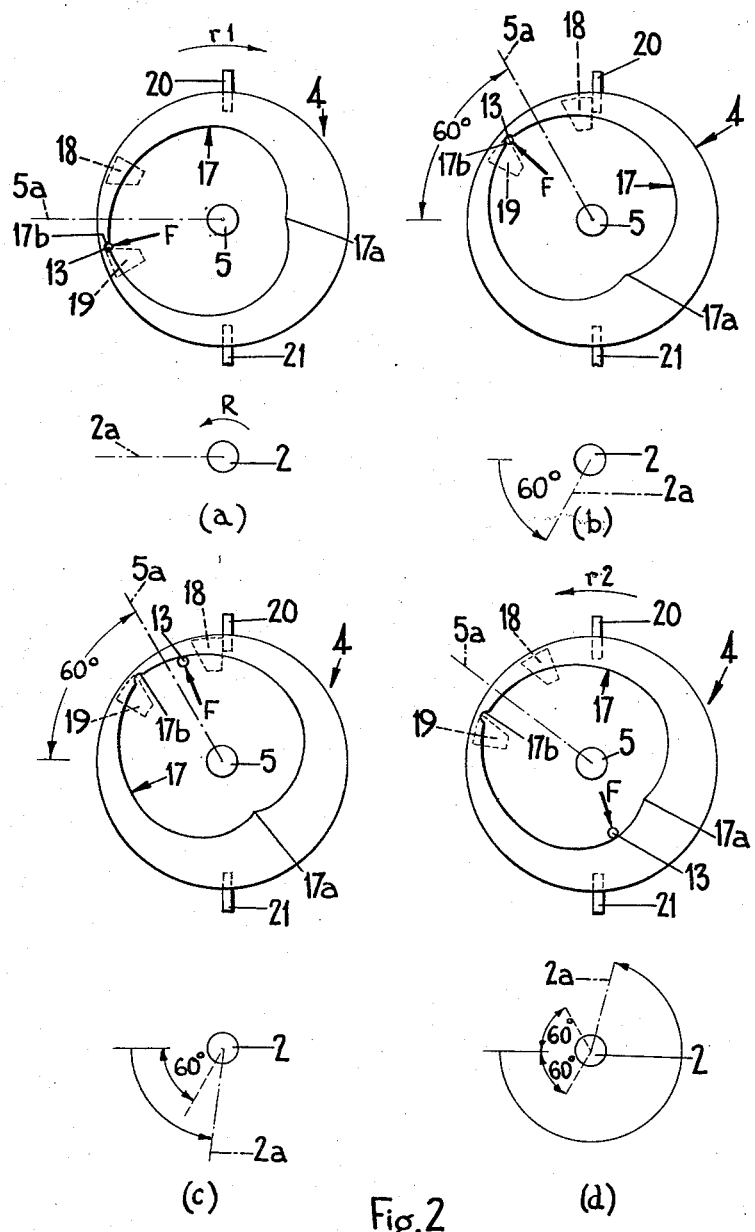

The operation of the shaft coupling described above with reference to FIGURE 1 will now be described with reference to FIGURES 2(a) to 2(d). In FIGURES 2(a) to 2(d) the driving member 1 and the shaft 15, together with the gear 3, have been omitted for clarity, and of these figures FIGURE 2(a) represents in diagrammatic form the relative angular positions of the driving shaft 2 and the driven shaft 5 as these are shown in FIGURE 1.

Referring to FIGURE 2(a), the roller 13 in this position engages with the indent 17b of the cam surface 17 and is maintained in engagement therewith under the action of the spring 8. This action of the spring 8 upon the roller 13 will be assumed to be equivalent to a radial force which is represented in FIGURE 2(a) (and also in each of FIGURES 2(b), 2(c), and 2(d)) by an arrow F.

If now, for example, the driving shaft 2 is rotated in a counterclockwise direction (as indicated by an arrow R) the resulting rotation in a clockwise direction of the driving member 1 is transmitted directly to the driven member 4 (as indicated by an arrow r1), and thereby to the shaft 5. The rotation of the driving member 1 is transmitted to the driven member 4 by the action of the roller 13 in its engagement with the cam surface 17 within the indent 17b, this action resulting from the force represented by the arrow F applied to the roller 13 and the torque applied to rotate the shaft 2.

As long as the counterclockwise rotation of the driving shaft 2 does not exceed an angle of 60 degrees from the datum position represented in FIGURE 2(a), the driven member 4 (and therefore the shaft 5) rotates in a clockwise direction from its datum position with the shaft 2, so that exact correspondence is maintained between the shaft 2 and the shaft 5. That is to say, within this range of 60 degrees the angular position of the driven shaft 5 is always in correspondence with the angular position of the driving shaft 2, so that in the present case, due to the 1:1 gear ratio between the gear 3 and the driving member 1, the angular displacement of the driven shaft 5 from the datum position of that shaft is equal to the angular displacement of the driving shaft 2 from its datum position.

It will be appreciated that the correspondence between the angular positions of the shafts 2 and 5 also applies for clockwise rotation of the shaft 2, and is, in general, maintained for any angular displacement of the shaft 2 within the range ±60 degrees about the datum position of that shaft.

Counterclockwise rotation of the shaft 2 through an angle of 60 degrees from the position represented in FIGURE 2(a) causes the driven member 4 to be rotated to the limiting position thereof, as represented in FIGURE 2(b), in which the stop 18 makes contact with the fixed stop 20. Up to this position of the driven member 4, there is no relative movement between the roller 13 and the cam surface 17 so that, as indicated above, there is exact correspondence between the driven shaft 5 and the driving shaft 2 for such rotation.

Referring to FIGURE 2(b), rotation of the driven member 4 in a clockwise direction, due to further counterclockwise rotation of the driving shaft 2, is prevented by the reaction between the stops 18 and 20. This reaction acts in the manner of a torque opposing rotation of the driven member 4 and thereby opposing the action of the roller 13 upon the indent 17b, to cause the roller 13 to roll out of the indent 17b. For this further counterclockwise rotation of the shaft 2, therefore, the roller 13 leaves the indent 17b and rolls around the cam surface 17 as shown for example in FIGURE 2(c).

Referring to FIGURE 2(c), the indent 17b is situated, as stated above, at that point of the cam surface 17b which is farthest from the axis of the shaft 5, so that as the roller 13 rolls round the cam surface 17 away from the indent 17b for counterclockwise rotation of the shaft 2, the arm 10b (FIGURE 1) is moved inwardly against the action of the spring 8 (FIGURE 1). The reaction of the roller 13 upon the surface 17, as a result tends to rotate the driven member 4 in a clockwise direction to hold the stop 18 against the stop 20 in a positive manner.

If the driving shaft 2 is now rotated in the opposite direction, that is in the clockwise direction, the roller 13 rolls over the cam surface 17 towards the indent 17b. The effective action of the spring 8 on the roller 13 maintains the stop 18 of the driven member 4 against the fixed stop 20 until the driving shaft 2 rotates back into the angular range of ±60 degrees about the datum position of that shaft. When the driving shaft 2 is rotated back into this angular range the roller 13 again engages with the indent 17b (as shown in FIGURE 2(b)), so that for further clockwise rotation of the driving shaft 2 within that range there is a corresponding rotation of the shaft 5.

For continued rotation of the driving shaft in the same direction as before, however, that is in the counterclockwise direction from the position as represented in FIGURE 2(c), the roller 13 continues to roll around the cam surface 17 away from the indent 17b against the action of the spring 8, until the roller 13 reaches the re-entrant portion 17a of the heart-shaped cam surface 17. As before, the stop 18 is maintained in positive contact with the stop 20 during this counterclockwise rotation of the shaft 2.

The re-entrant portion 17a of the cam surface 17 lies, as stated above, at the nearest point of this surface to the axis of the shaft 5, and any further small counterclockwise rotation of the driving shaft 2 causes the roller 13 to roll up and over this re-entrant portion 17a. As the roller 13 rolls over to the other side of the re-entrant portion 17a, the reaction of the roller 13 upon the cam surface 17 changes direction, and this causes the driven member 4 to rotate, as represented in FIGURE 2(d), in the counterclockwise direction indicated by an arrow r2 in that figure. The driven shaft 5 is, as a result, rotated in the direction away from the limiting position in which, up to now, it has been held by the co-operation of the stops 18 and 20.

This latter rotation of the driven shaft 5 is solely due to the action of the spring 8 upon the roller 13 and the shape of the cam surface 17, being in fact independent of any counterclockwise rotation of the shaft 2 except that which causes the roller 13 to roll over the re-entrant portion 17a. The driven member 4 (and therefore the shaft 5) continues to rotate in the clockwise direction under the action of the spring 8 until the shaft 5 reaches the limiting position in which the stop 19 makes contact with the fixed stop 21. The stop 19 is positively held against the stop 21 by the reaction between the roller 13 and the cam surface 17 on this side of the re-entrant portion 17a.

If the driving shaft 2 is further rotated, still in the counterclockwise direction, to re-enter the angular range of ±60 degrees about the datum position of that shaft, the roller 13 once again engages the indent 17b as the driving shaft 2 enters this range. Any rotation of the driving shaft 2 within this range is thereby transmitted to the driven shaft 5, in the manner described above, to thereby maintain exact correspondence between the shafts 2 and 5 within this range.

If, however, the driving shaft 2 is rotated in the clockwise direction from the position thereof as represented in FIGURE 2(d), the action of the spring 8 upon the roller 13 holds the stop 19 against the fixed stop 21 until the roller 13 once again rolls over the re-entrant portion 17a, this time in the counterclockwise direction. The action of the roller 13 upon the cam surface 17 now causes the driven member 4 to be rotated back in a clockwise direction to the position in which (as represented in FIGURE 2(c)) the stop 18 is held against the fixed stop 20.

It will be appreciated that for any angular position of the driving shaft 2 outside the angular range of ±60 degrees about its datum position, the reaction between the roller 13 and the cam surface 17 acts to hold one of the stops 18 and 19 positively against the corresponding fixed stops 20 and 21, and therefore to hold the shaft 5 in one of its limiting positions. The particular one of the stops 18 and 19 which is held against one of the fixed stops 20 and 21 in these circumstances at any one time, is dependent upon which side of the cam surface 17 from the re-entrant portion 17a the roller 13 is at that time positioned. This ensures that, if the shaft 2 then re-enters the angular range of ±60 degrees about its datum position, the roller 13 immediately then re-engages the indent 17b to maintain the correspondence between the shafts 2 and 5 over that range.

Although in the above explanation of the operation of the coupling it has been assumed that the force imposed upon the roller 13 under the action of the spring 8 is a radial force (represented by the arrow F), this force is not exactly radial due to the pivoted arrangement of the arm 10b carrying the roller 13. This latter fact does not of course materially affect the operation of the coupling as described above, but is the reason why the cam surface 17 in the present case is asymmetrically shaped about that diameter of the member 4 which passes through the re-entrant portion 17a. If the two halves of the cam surface 17 about this diameter were of the same shape, with the indent 17b positioned diametrically opposite the re-entrant portion 17a, then the effective torques acting upon the driven member 4 for clockwise and counterclockwise movement of the shaft 2 outside the angular range of ±60 degrees, would be unequal. With the asymmetrical shape of the cam surface 17 in the present coupling, these effective torques are approximately equal.

Although in the arrangement described above with reference to FIGURE 1, the driving shaft 2 is coupled to the driven shaft 5 through the gear 3 and the coupling formed by the driving member 1 and the driven member 4, it will be appreciated that if the shafts 2 and 5 were axially aligned these shafts could be similarly coupled together by omitting the gear 3 and securing the driving member 1 to the shaft 2 to rotate with that shaft instead of about the fixed shaft 15.

In addition, although in the shaft coupling described above with reference to FIGURE 1 it has been assumed that the gear ratio between the gear 3 and the driving member 1 is 1:1, it will be appreciated that any other gear ratio might be used. In spite of this, a predetermined angular correspondence, dependent upon the particular gear ratio used, will always exist between the driving shaft 2 and the driven shaft 5 over the range of angular positions of the driving shaft 2 for which the angular position of the driving member 1 lies within the range of ±60 degreess about the position of that member 1 as represented in FIGURE 1. This correspondence is maintained by the rotation of the driving member 1 with the driving shaft 2 and the resulting reaction between the cam surface 17 and the roller 13.

I claim:

1. A shaft coupling for coupling two shafts together, said coupling comprising an internal cam to be carried by one of the shafts, a cam follower to be carried by the other shaft, and means to urge the cam follower against the cam, the cam having a first portion which is shaped to provide a detent to engage with the cam follower to transmit rotation between the shafts and a second portion which is shaped to react with the cam follower to urge relative rotation between the shafts to bring the cam follower and detent into engagement, whereby reaction between the cam and the cam follower tends to maintain a predetermined angular correspondence between the shafts in which there is engagement between the cam follower and the detent, irrespective of any rotation of one shaft without the other.

2. A shaft coupling for coupling two shafts together, said coupling comprising a cam to be carried by one of the shafts, a cam follower to be carried by the other shaft, and means to urge the cam follower against the cam, the cam having an internal heart-shaped cam surface which comprises a portion that is shaped to provide a detent to engage with the cam follower to transmit rotation between the shafts, two smoothly curved portions, and a cusp that interconnects the two smoothly curved portions and which lies substantially opposite the detent across a rotational axis of the cam, the two curved portions extending from the detent in opposite directions around the rotational axis to the cusp and being shaped to react with the cam follower to urge relative rotation between the shafts to bring the cam follower and detent into engagement, whereby reaction between the cam and the cam follower tends to maintain a predetermined angular correspondence between the shafts in which there is engagement between the cam follower and the detent, irrespective of any rotation of one shaft without the other.

3. A shaft coupling for coupling a driving shaft to a driven shaft to maintain a predetermined angular correspondence between those shafts over a finite angular range of rotation of the driving shaft irrespective of any rotation of the driving shaft outside that range, said coupling comprising a cam to be rotated with one of the two shafts, a cam follower to be rotated with the other shaft, means to urge the cam follower against the cam, two fixed stops, and stop means to be carried by the driven shaft to abut one of the two stops when the driven shaft is in one of two limiting angular positions of an angular range corresponding to said range of the driving shaft, and to abut the other of the two stops when the driven shaft is in the other of said limiting angular positions, the cam having an indent to engage with the cam follower to transmit rotation between the driving and driven shafts for rotation of the driving shaft within its said angular range, and the cam also being of a shape to react with the cam follower while the cam follower is disengaged from the indent to urge relative rotation between the two shafts such as to bring the cam follower into engagement with the indent.

References Cited in the file of this patent

UNITED STATES PATENTS

| | | |
|---|---|---|
| 1,166,457 | Higgins | Jan. 4, 1916 |
| 1,919,651 | Helsel | July 25, 1933 |
| 1,987,742 | Lawrence | Jan. 15, 1935 |
| 2,292,544 | Pfeiffer | Aug. 11, 1942 |
| 2,366,637 | Mejean et al. | Jan. 2, 1945 |
| 2,634,840 | Bornzin | Apr. 14, 1953 |
| 2,647,600 | Anderson | Aug. 4, 1953 |
| 2,746,584 | Skromme | May 22, 1956 |
| 2,837,902 | Stevens et al. | June 10, 1958 |